United States Patent
Van Bokkelen et al.

(10) Patent No.: US 10,918,122 B2
(45) Date of Patent: Feb. 16, 2021

(54) METHOD FOR PRODUCING A CLEAR BEVERAGE

(71) Applicant: Cargill, Incorporated, Wayzata, MN (US)

(72) Inventors: Reginald Van Bokkelen, Braine-l'Alleud (BE); Wouter Marie Georges Van Beneden, Antwerp (BE)

(73) Assignee: Cargill, Incorporated, Wayzata, MN (US)

( * ) Notice: Subject to any disclaimer, the term of this patent is extended or adjusted under 35 U.S.C. 154(b) by 184 days.

(21) Appl. No.: 16/095,480

(22) PCT Filed: Apr. 20, 2017

(86) PCT No.: PCT/US2017/028624
§ 371 (c)(1),
(2) Date: Oct. 22, 2018

(87) PCT Pub. No.: WO2017/189333
PCT Pub. Date: Nov. 2, 2017

(65) Prior Publication Data
US 2019/0090516 A1 Mar. 28, 2019

(30) Foreign Application Priority Data

Apr. 25, 2016 (EP) ..................... 16166862

(51) Int. Cl.
| | |
|---|---|
| *A23L 2/56* | (2006.01) |
| *A23L 29/10* | (2016.01) |
| *A23L 27/12* | (2016.01) |
| *A23L 2/58* | (2006.01) |
| *A23L 2/52* | (2006.01) |
| *A23L 2/54* | (2006.01) |
| *A23L 2/39* | (2006.01) |

(52) U.S. Cl.
CPC ............... *A23L 2/56* (2013.01); *A23L 2/39* (2013.01); *A23L 2/52* (2013.01); *A23L 2/54* (2013.01); *A23L 2/58* (2013.01); *A23L 27/12* (2016.08); *A23L 27/13* (2016.08); *A23L 29/10* (2016.08); *A23V 2002/00* (2013.01)

(58) Field of Classification Search
CPC ................ A61K 8/062; A23V 2002/00; A23V 2250/5118; A23L 2/56; A23L 27/13; A23L 29/10; A23L 2/39; A23L 1/054; A23L 2/44; A23L 1/0522; A23L 2/52; A23D 7/005
See application file for complete search history.

(56) References Cited

U.S. PATENT DOCUMENTS

2010/0323066 A1* 12/2010 Comstock ............... A23L 27/80
426/72

FOREIGN PATENT DOCUMENTS

| JP | 2009240219 A | 10/2009 | |
|---|---|---|---|
| WO | WO-2008039564 A1 * | 4/2008 | ............. A23L 27/12 |
| WO | WO2014210326 | 4/2015 | |

OTHER PUBLICATIONS

Ljubica, Doki , et al., "Physicochemmical Characteristics and Stability of Oil-in-Water Emulsions Stabilized by OSA Starch", Food Hydrocolloids, Elsevier BV, NL, vol. 29, No. 1 XP028422232, ISSN: 0268-005X, Feb. 13, 2012, 185-192.

Tesch, S. , "Stabilization of Emulsions by OSA Starches", Journal of Food Engineering, Barking, Essex, GB. vol. 54, No. 2, XP001184187, Jan. 1, 2002, 164-174.

* cited by examiner

*Primary Examiner* — Hong T Yoo

(57) ABSTRACT

The invention relates to a method for producing a clear beverage comprising the steps of: (i) providing an oil-in-water (O/W) emulsion comprising an n-alkenyl succinate starch and an essential oil, wherein the n-alkenyl succinate starch is in excess of said essential oil; (ii) producing a turbid beverage by diluting said O/W emulsion to reach a desired beverage concentration; and (iii) storing said turbid beverage at a temperature of above 30° C. for a time sufficient to obtain a clear beverage.

20 Claims, 1 Drawing Sheet

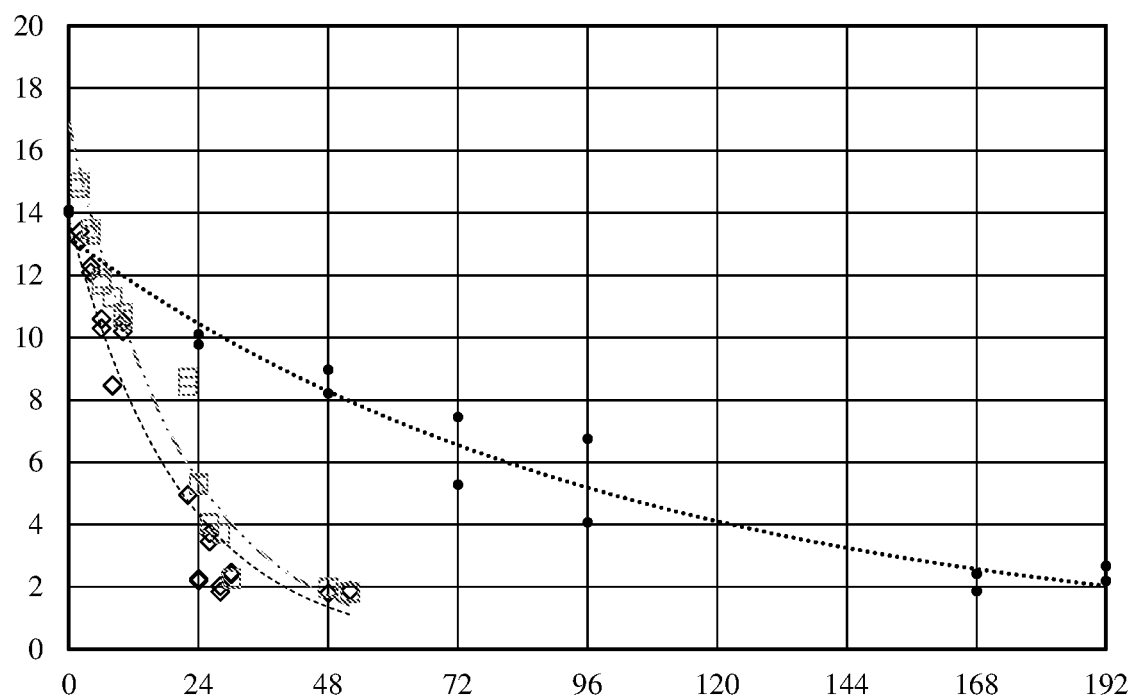

METHOD FOR PRODUCING A CLEAR BEVERAGE

CROSS REFERENCE TO RELATED APPLICATIONS

This application is a national phase application of PCT/US17/028624, filed 20 Apr. 2017, entitled METHOD FOR PRODUCING A CLEAR BEVERAGE, which claims the benefit of priority to European Application No. 16166862.9, filed 25 Apr. 2016, entitled METHOD TO PRODUCE CLEAR BEVERAGES, which are hereby incorporated by reference in their entirety.

FIELD OF INVENTION

The invention relates to a method for producing clear beverages. In particular, the invention relates to a method which utilizes an emulsion comprising n-alkenyl succinic anhydride starch for producing clear beverages. The beverages are preferably citrus flavoured beverages.

BACKGROUND

Beverages are often produced from a beverage emulsion, which is then diluted. Beverage emulsions are generally oil-in-water emulsions which contain oil-soluble ingredients that impart flavour, colour, or other qualities to the emulsion. A key consideration for beverage emulsions is the emulsion stability. It is desirable that the constituent phases of the emulsion remain adequately mixed at least for the shelf-life of the product. Otherwise, the flavour and attractiveness of the beverage may be affected. A ready-to-drink beverage typically contains a small amount of beverage emulsion dispersed in water along with a number of other ingredients, such as sweeteners, acidity regulators and preservatives.

Essential oils are amongst the most widely used flavouring agents in the beverage industry, with citrus oils being particularly popular. Beverages flavoured with citrus oils can be made to have a cloudy or clear appearance. Cloudiness is largely due to the presence of water insoluble compounds, including but not limited to terpenes, in essential oils such as citrus oils. This appearance may be favoured, for example to give the impression that the drink is rich in juices. However, there is also a large demand for e.g. clear citrus flavoured drinks, which appeal more to consumers.

Traditionally, clear citrus flavoured drinks have been made by removing the terpenes from citrus oils by "washing" the oil with a solvent (also known as deterpenation). A widely-used solvent for deterpenation is ethyl alcohol (J. Owusu-Yaw et. al, Journal of Food Science vol. 51, no. 5, 1986). The technique involves adding a mixture of ethyl alcohol and water to the citrus oil to extract the water soluble components and leave behind the water insoluble terpenes. The water soluble components may then be used to make a clear citrus flavoured beverage. An important drawback of this process is that it delivers a product which is not Halal. Propylene glycol is an alternative, Halal, solvent (U.S. Pat. No. 6,458,408 B1).

Washing citrus oils may, however, have several disadvantages, in particular the high cost of the process. Both ethyl alcohol and propylene glycol are expensive materials. In addition, the process is time consuming, generally requiring a minimum of 48 hours to complete, which in turn may have a negative impact on running costs and yield. Also, batch-to-batch variation is common, making the process unreliable. Washing also may have an effect on the quality of the final product. Some desirable flavour notes of the citrus oil may be lost during this process. Usually, beverages made with terpeneless oils tend to taste "flat".

Other ways of making clear citrus flavoured beverages have been developed. One technique is to formulate the citrus oils into a microemulsion. However, making microemulsions generally requires high concentrations of surfactants and solvents in order to stabilize the emulsion. Large amounts of such ingredients are undesirable due to regulatory restrictions. Moreover, a large amount of mechanical energy is generally required to make such microemulsions since the ratio of oil to emulsifier is not optimal.

WO2008/039564 A1 discloses a process for solubilizing flavour oils to produce clear beverages.

Furthermore, in industry, beverages are generally stored for a period of time after production, known as the quarantine period, for quality and safety testing. A generally accepted standard quarantine period is around 1-2 days after production. However, there are beverages which require a storage period of several days after their production to reach their final properties, e.g. the required clarity; and hence the quality and safety testing would be delayed until the beverage reaches its final properties.

The long interval of time, i.e. the storage period together with the quarantine period, between the production of such a beverage and its release to consumer may negatively impact the beverage's production process, e.g. decrease the process yield, imposing the need of a storage space, increasing the energy consumption and decreasing the time that the beverage reaches the final consumer. It is thus desired to provide a production process for a clear beverage which does not require such a long storage time, i.e. the production process produces a clear beverage which can be immediately subjected to quality and safety testing.

SUMMARY OF INVENTION

The present invention, which seeks to address the problems identified above, provides a method for producing a clear beverage comprising the steps of:
(i) Providing an oil-in-water (O/W) emulsion comprising an n-alkenyl succinate starch and an essential oil, wherein the n-alkenyl succinate starch is in excess of said essential oil;
(ii) Producing a turbid beverage by diluting said O/W emulsion to reach a desired beverage concentration; and
(iii) Storing said turbid beverage at a temperature of above 30° C. for a time sufficient to obtain a clear beverage.
(iv) In some embodiments, the n-alkenyl succinate starch is n-octenyl succinic anhydride (nOSA) starch. For simplicity, the O/W emulsion used at step (i.) above is referred to throughout the present disclosure as "the beverage emulsion".

The inventors surprisingly observed that the method of the invention, hereinafter the inventive method eliminates the need to store the beverage for several days in order for it to reach its final properties.

BRIEF DESCRIPTION OF FIGURES

Specific and non-limiting embodiments of the invention, in all its aspects, will be described with reference to the accompanying drawings, in which:

FIGURE—shows a comparison for the turbidity development with time of the beverages made in accordance with the invention versus a beverage made with a different process.

DETAILED DESCRIPTION OF INVENTION

The inventive method uses an oil-in-water (O/W) emulsion comprising an n-alkenyl succinate starch and an essential oil. The most preferred n-alkenyl succinate starch is a n-octenyl succinic anhydride (nOSA) starch. It is important that the n-alkenyl succinate starch is in excess of the essential oil.

Explanations of abbreviations and terms used in this disclosure are provided to assist in comprehending and practicing the invention. When used in this specification and claims, the terms "comprises" and "comprising" and variations thereof mean that the specified features, steps or integers are included. The terms are not to be interpreted to exclude the presence of other features, steps or components.

Beverage: A drink. Most manufactured beverages are mixtures produced by first making a beverage emulsion, and then diluting the emulsion to make a ready-to-drink beverage.

A beverage emulsion is a concentrated emulsion comprising ingredients that impart certain properties to the final beverage, such as flavour, colour, and mouthfeel. Beverage emulsions are generally oil-in water emulsions comprising an oil concentration of between 0.7% and 50%. Preferably the beverage emulsions according to the invention have an essential oil concentration of between 0.75% and 40%, more preferably between 1% and 35%, even more preferably between 1.5% and 25%, most preferably between 2% and 20%. In contrast, the final beverage will preferably have an essential oil concentration of between 0.001% to below 0.70%. Preferably, the clear beverage produced with the inventive method has an essential oil concentration of between 0.002% and 0.50%, more preferably between 0.004% and 0.10%, most preferably between 0.005% and 0.020%. The above percentages are calculated with reference to the total weight of the beverage emulsion or clear beverage, respectively.

Essential oils: are oils containing volatile aroma compounds from plants. Essential oils are also known as volatile oils, ethereal oils or aetherolea. Essential oils contain terpenes, which are water-insoluble hydrocarbon components that are primarily responsible for the cloudy appearance of such oils. The general formula for terpenes is $(C_5H_8)_n$. Terpenes may be hemiterpenes, i.e. contain a single isoprene $(C_5H_8)$ unit; monoterpenes, i.e. contain two isoprene units; but also polyterpenes having more than two isoprene units. Preferably, the essential oils are natural essential oils, i.e. oils that can be extracted from plants such as those enumerated hereinbelow and variations thereof. Synthetic essential oils, i.e. essential oils which are lab made, can also be used.

Citrus oils: Essential oils extracted from citrus fruits, e.g. from the rind of citrus fruits. Citrus fruits include lemons, limes, oranges, tangerines, mandarins, bergamots, and grapefruits.

Clarity: A description of the transparency of a substance, assessed by eye, i.e. optically. A liquid which appears transparent does so because it scatters little or no visible light. Clarity is related to turbidity (see below). For example, water appears visually clear if it has a turbidity of less than 5 NTU.

Degree of substitution (DS): The average number of substituent groups attached per base unit of a polymer. In the case of nOSA starch, DS refers to the average number of hydroxyl groups on the starch that are substituted with an n-octenyl succinic anhydride group, for a given amount of starch. For example, the degree of substitution may be between 0.1% and 3%, meaning that between 0.1% and 3% of the hydroxyl groups on the starch are substituted with an n-octenyl succinic anhydride group.

Deterpenation ("washing"): Method of removing terpenes from essential oils, e.g. by solvent extraction. Commonly used solvents are ethyl alcohol and propylene glycol.

Edible oils: Oils fit for human consumption. Edible oils are widely used in the food and beverage industry to add flavour, colour, or oil-soluble ingredients, such as neutraceuticals, to products.

Emulsifiers: Amphiphillic substances that stabilize the interface between the phases of an emulsion by reducing interfacial tension. Examples of food-grade emulsifiers are lecithin, ascorbyl palmitate, polysorbate.

Emulsions: Mixtures containing two immiscible liquids, in which one liquid is dispersed as droplets or globules throughout the other. The dispersed liquid is called the dispersed phase, while the other liquid is called the continuous phase. In an oil-in-water emulsion, the oil is the dispersed phase, and water is the continuous phase.

Microemulsions: Emulsions having a very fine droplet size. They are formed by mixing oil with a mixture of surfactants and solvents. The droplets in a microemulsion are so small that visible light is able to penetrate through the emulsion with little or no scattering. As a result, the microemulsion appears clear, i.e. transparent, to the eye.

n-Octenyl succinic anhydride (nOSA): A reagent that can be used to modify starch. Treatment of starch with nOSA results in a modified starch which has both hydrophilic and hydrophobic moieties, making it a useful emulsifier. An exemplary nOSA starch fragment is shown below:

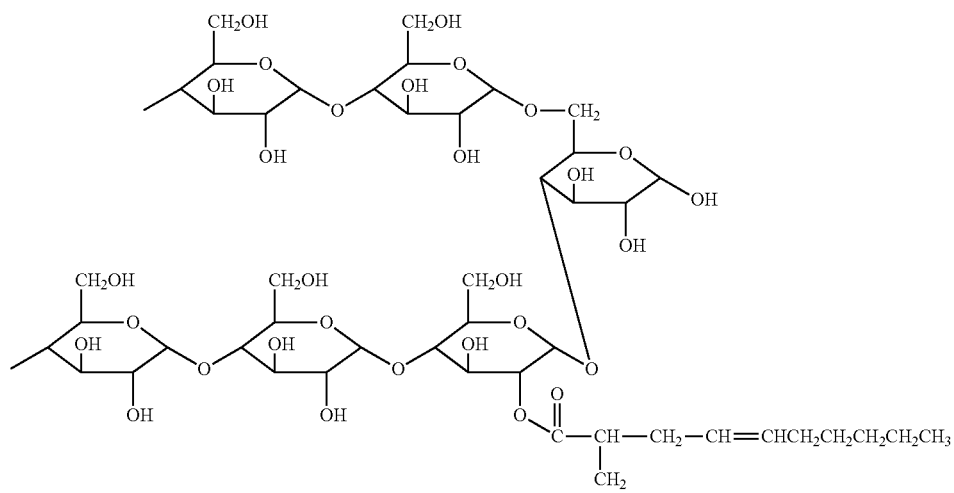

Starch Molecule            n-octenyl succinyl chain

Nutraceuticals: Substances which may be added to a food or beverage product to increase the nutritional value of the product. Nutraceuticals include vitamins, minerals, herbs, amino acids, enzymes, metabolites and others.

Pre-emulsion: Also known as a crude, coarse, or primary emulsion. An emulsion formed prior to homogenization. Homogenization reduces the droplet size of a pre-emulsion to form a finer emulsion.

Starch: A carbohydrate polymer. Starches comprise amylose and/or amylopectin and are typically in the form of granules. Amylopectin is the major component (about 70% to 80%) of most starches. It is found in the outer portion of starch granules and is a branched polymer of several thousand to several hundred thousand glucose units. Amylose is the minor component (about 20 to 30%) of most starches. However, there are high amylose starches with 50% to 70% amylose. Amylose is found in the inner portion of starch granules and is a linear glucose polymer of several hundred to several thousand glucose units.

Sources of starches that can be used for the purpose of the invention include but are not limited to fruits, seeds, and rhizomes or tubers of plants. Common sources of starch include but are not limited to rice, wheat, corn, potatoes, tapioca, arrowroot, buckwheat, banana, barley, cassava, kudzu, oca, sago, sorghum, sweet potatoes, taro and yams. Edible beans, such as favas, lentils and peas, are also rich in starch.

A modified starch has a structure that has been modified from its native state, resulting in modification of one or more of its chemical or physical properties. Starches may be modified, for example by enzymes, oxidation, or substitution with various compounds. For example, starches can be modified to increase stability against heat, acids, or freezing, improve texture, increase or decrease viscosity, increase or decrease gelatinization times, and/or increase or decrease solubility, among others. Modified starched may be partially or completely degraded into shorter chains of glucose molecules. Amylopectin may be debranched. In one example, modified starched are cross-linked, for example to improve stability. Starches that are modified by substitution have a different chemical composition. An n-alkenyl succinate starch is a modified starch which has been partially substituted with an n-alkenyl succinate. A nOSA starch is a modified starch which has been partially substituted, e.g. from about 0.1% to about 3%, with n-octenyl succinic anhydride. nOSA starch is a known food additive (designated E-1450 by the European Food Safety Authority).

Throw: An optional intermediary mixture made with a beverage emulsion before dilution to make the final ready-to-drink beverage. In Europe, a throw is 1+4 and 1+5, while in the USA a throw is 1+4.4 and 1+5.4. The oil content will depend on the throw ratio. A 1+4 throw made out of beverage emulsion has an oil concentration between 0.025% and 2.5%.

Turbidity: A measure of the clarity of a liquid. A liquid with high turbidity will appear cloudy or hazy, whilst one with low turbidity will appear clear. Turbidity is determined in Nephelometric Turbidity Units (NTU) using a nephelometer (also known as a turbidimeter, e.g. Hach 2100N—Germany), which measures the propensity of particles in the liquid to scatter light. A turbidimeter is calibrated using pre-mixed Formazin solutions (StabCal 26621-10, Hach-Germany) from 0.1, 20, 200, 1000, 4000 NTU.

Substitution: The act, process, or result of replacing one thing with another. Substitution may refer to the replacement of one functional group in a molecule by another as a result of a chemical reaction. For example, n-octenyl succinic anhydride may be used in a substitution reaction with starch to produce a nOSA starch.

All ratios of emulsion or pre-emulsion components refer to percentage by weight (wt. %), unless otherwise specified. Parameter ranges include the end-points and all values in between, unless otherwise specified.

Preferably, the beverage emulsion comprises n-alkenyl succinate starch and essential oil in a ratio of between 1.2:1 and 8:1, more preferably between 2:1 and 8:1, even more preferably between 2.5:1 and 8:1, even more preferably between 2.5:1 and 6:1, even more preferably between 2.5:1 and 5:1, most preferably between 4:1 and 6:1 (wt. %).

Preferably, the beverage emulsion comprises nOSA starch and essential oil in a ratio of between 1.2:1 and 8:1, more preferably between 2:1 and 8:1, even more preferably between 2.5:1 and 8:1, even more preferably between 2.5:1 and 6:1, even more preferably between 2.5:1 and 5:1, most preferably between 4:1 and 6:1 (wt. %).

These preferred ratios may produce beverage emulsions that can be used to make beverages of optimal clarity, and which are also stable and cost-effective to make.

Preferably, the nOSA starch used in the beverage emulsion has a degree of substitution of 3% or less, excluding 0%, preferably between 2.5 and 3%, most preferably between 2.5 and below 3%.

Excess levels of n-alkenyl succinate starch and in particular of nOSA starch have not previously been used to make clear beverages because these starches were thought to contribute to opacity. The inventors have found that an emulsion comprising an excess of an n-alkenyl succinate starch, particularly nOSA starch, unexpectedly results in a beverage that has optical clarity and low turbidity, in particular when produced according to the method of the invention. The quantity of n-alkenyl succinate modified starch in the beverage emulsion and in the final, clear beverage may vary, as long as said starch remains in excess to the quantity of essential oil.

Preferably, the beverage emulsion used in accordance with the invention contains a single compound having emulsifying properties, said compound preferably being an n-alkenyl succinate starch, more preferably a nOSA starch.

In alternative embodiments, a small amount of additional emulsifiers and/or solvents may be used in order to improve the surface tension conditions to produce a fine droplet size when certain, more viscous, essential oils are used. Preferably, the additional emulsifier is polysorbate. Other emulsifiers that may be used are sucroesters, lecithin, or ascorbyl palmitate. When additional emulsifiers and/or solvents are used, they do not need to be added in as high quantities as in traditional beverage emulsions.

The beverage emulsion used in accordance with the invention has an oil phase which comprises an essential oil. Preferably, the essential oil comprises citrus oil, more preferably the essential oil consists of citrus oil. The citrus oil may be selected from lemon oil, lime oil, orange oil, grapefruit oil, tangerine oil, mandarin oil, bergamot oil, or grapefruit oil or any combination of two or more of these.

In alternative embodiments, the essential oil in the emulsions comprises, preferably consists of, an oil chosen from the group consisting of oils extracted from plants of the Rutaceae family, e.g. *Aegle, Citrus, Casimiroa, Clymenia, Glycosmis* and *Triphasia*; of the Apiaceae family, e.g. angelica, anise, arracacha, asafoetida, caraway, carrot, celery, Centella asiatica, chervil, cicely, coriander (cilantro), culantro, cumin, dill, fennel, hemlock, lovage, cow parsley, parsley, parsnip, cow parsnip, sea holly, giant hogweed and silphium; of the Lamiaceae family, e.g *Mentha aquatica, Mentha arvensis, Mentha asiatica, Mentha australis, Mentha canadensis, Mentha cervina, Mentha citrata, Mentha crispata, Mentha dahurica, Mentha diemenica, Mentha laxiflora, Mentha longifolia, Mentha piperita, Mentha pulegium, Mentha requienii, Mentha sachalinensis, Mentha satureioides, Mentha spicata, Mentha suaveolens* and *Mentha vagans*; of the Myrtaceae family, e.g. bay rum tree, clove, guava, acca (feijoa), allspice and *eucalyptus*; of the Lauraceae family, e.g. *Actinodaphne, Aiouea, Alseodaphne, Aniba, Apollonias, Aspidostemon, Beilschmiedia, Carvodaphnopsis, Camphora, Cassytha, Chlorocardium, Cinnadenia, Cinnamomum, Cryptocarya, Dehaasia, Dicypellium, Dodecadenia, Endiandra, Endlicheria, Eusideroxylon, Gamanthera, Hufelandia, Hypodaphnis, Iteadaphne, Kubitzkia, Laurus, Licaria, Lindera, Litsea, Machilus, Malapoenna, Mespilodaphne, Mezilaurus, Misanteca, Mocinnodaphne, Mutisiopersea, Nectandra, Neocinnamomum, Neolitsea, Notaphoebe, Nothaphoebe, Ocotea, Oreodaphne, Parasassafras, Parthenoxylon, Paraia, Persea, Phoebe, Phyllostemonodaphne, Pleurothyrium, Polyadenia, Potameia, Potoxylon, Povedadaphne, Ravensara, Rhodostemonodaphne, Sassafras, Schauera, Sextonia, Sinopora, Sinosassafras Syndiclis, Systemonodaphne, Tetranthera, Umbellularia, Urbanodendron, Williamodendron*, and *Yasunia*; or any combination of two or more of these.

The beverage emulsion used in accordance with the invention can be prepared by any process known in the art, for example by a process comprising the steps of:
a) Preparing a pre-emulsion having an oil phase and an aqueous phase, the oil phase comprising the essential oil, the pre-emulsion further comprising the n-alkenyl succinate starch and wherein said n-alkenyl succinate starch is in an excess amount compared to the amount of essential oil; and
b) Homogenizing the pre-emulsion to obtain said beverage emulsion.

Preferably, the n-alkenyl succinate starch in the pre-emulsion is n-octenyl succinic anhydride (nOSA) starch. The above preferred given values in relation to the beverage emulsion for the ratio of n-alkenyl succinate starch starch to essential oil and for the ratio of nOSA starch to essential oil are equally applicable for the pre-emulsion and will not be repeated herein.

The n-alkenyl succinate starch, preferably the nOSA starch, may form part of the aqueous phase of the pre-emulsion or of the oil phase of the pre-emulsion.

In case that additional emulsifiers and/or co-solvents are used, it is preferred that these components are added before homogenization and be mixed with the oil phase in order to decrease the surface tension.

Preferably, the homogenization is carried out with a homogenisation pressure of between 100 bar and 1500 bar, more preferably between 100 and 500 bar, even more preferably about 300 bar. Preferably, the homogenization pressure may be applied for between 1 and 3 passes. In a preferred embodiment, the homogenisation is carried out preferably in one pass with a micro fluidizer at a pressure of at least 500 bar, more preferably at least 750 bar. Preferably, the homogenisation is carried out in at least two passes, more preferably in at least three passes. The inventors observed that by carrying out the homogenisation at higher pressures and/or with more than one passes, the turbidity of the beverage can be reduced faster during the storage, i.e. requiring a shorter storage time. The pre-emulsion may be homogenized using any technique known in the art, such as with a standard-valve homogenizer, high-sheer mixer, ultra-sonication, or microfluidisation.

Preferably, the pre-emulsion does not comprise any additional emulsifiers, i.e. only the n-alkenyl succinate starch, more preferably the nOSA starch, is used as emulsifier.

The beverage emulsion may be dried into a powder form, in which case it is preferred to hydrate said emulsion before using it in the inventive method. The inventive method may also contain the step of making the beverage emulsion into a throw and subsequently diluting the throw to obtain the desired beverage concentration. Other ingredients, such as sweeteners, acidity regulators, and/or preservatives, can be added to the beverage emulsion before, during or after dilution.

In preferred embodiments, the beverage emulsion has a stability index between 0.95 and 1, inclusive.

The beverage emulsion may be dried to form a powder which can be easily transported and stored. The powder can be re-hydrated to form an emulsion or a turbid beverage as desired.

The inventive method further contains at (ii.) the step of diluting the aforementioned beverage emulsion. Any suitable solvent may be used for dilution, e.g. water, alcohols, aqueous solutions, aqueous alcoholic solutions and the like. A preferred solvent is the aqueous solution, most preferred solvent is water.

It is preferred that the ratio of n-alkenyl succinate modified starch, e.g. nOSA starch, to essential oil remains essentially the same in the pre-emulsion, beverage emulsion and final, clear beverage. These stages differ primarily in the level of dilution. A pre-emulsion may have an essential oil concentration of e.g. 2% to 20%, a 1+4 throw may have an essential oil concentration of e.g. 0.025% to 2.5%, preferably 0.025% to 1.995%, and the final, clear beverage may have an essential oil concentration of e.g. 0.005% to 0.5%, preferably between 0.005% and 0.020%.

Preferably, the turbid beverage obtained at step (ii) of the inventive method has a turbidity of between 10 and 50 NTU, more preferably between 12 and 45 NTU, even more preferably between 14 and 40 NTU, yet even more preferably between 16 and 35 NTU, yet even more preferably of between 18 and 30 NTU, most preferably between 20 and 25 NTU. The turbidity of the beverage obtained at said step (ii) can be adjusted in the desired range for example by utilizing a beverage emulsion homogenised at higher pressures and/or using more homogenisation passes.

The inventive method further comprises storing the turbid beverage at a temperature of above 30° C. for a time sufficient to obtain a clear beverage.

By clear beverage is herein understood a beverage having a turbidity of less than 8.0 NTU. Preferably, the clear beverage has a turbidity of at most 7.5 NTU, more preferably at most 5.5 NTU, even more preferably at most 5.0 NTU, yet even more preferably at most 4.5 NTU, yet even more preferably at most 4.0 NTU, yet even more preferably at most 3.5 NTU, yet even more preferably at most 3.0 NTU, yet even more preferably at most 2.5 NTU, yet even more preferably at most 2 NTU, yet even more preferably at most 1.5 NTU, yet even more preferably at most 1 NTU, most preferably at most 0.5 NTU. The inventors observed that the beverage remains clear and stable after the storage.

The turbid beverage is preferably stored at a temperature of at least 35° C., more preferably at least 40° C., most preferably at least 45° C. The turbid beverage is preferably stored at said temperature for a storing time, i.e. the time sufficient to obtain a clear beverage, of at most 48 hours, more preferably at most 36 hours, even more preferably at most 24 hours, most preferably at most 12 hours. Said storing time is preferably at least 2 hours, more preferably at least 5 hours, most preferably at least 8 hours.

Storing is preferably done in isothermal conditions, i.e. the temperature variations are reduced to less than 1° C. Preferred devices for storing include a storage cabinet, an oven, a thermostated bath, acclimatized chamber and the like.

The inventive method does not necessarily include a deterpenation step and can be used instead of traditional washing methods for making clear beverages. Therefore, the negative effects associated with the deterpenation process can be avoided. As terpenes are retained using the disclosed method, the beverage obtained with the method of the invention may have a fresher flavour, which may be generally attributed to the presence of terpenes. In addition, n-alkenyl modified starch, such as nOSA starch, is a comparatively low cost ingredient compared to alcohol or propylene glycol which are used to remove (or wash) the terpenes. Therefore, the inventive method provides a low-cost alternative to washing. The invented process is also simpler, shorter, and more user-friendly than currently known methods in particular washing.

The inventive method may also be used to produce transparent coloured beverages containing oil-soluble pigments, such as beta-carotene, paprika or lutein. The invention may also be used to produce health drinks containing oil-soluble nutraceuticals, such as vitamins and minerals.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof. For example, although the above disclosure relates to nOSA starch, OSA modified starch could alternatively be used. OSA modified starch has a branched, rather than linear, octenyl group. Methods for making OSA modified starch are known in the art.

The invention will now be described by the following non-limiting examples.

EXAMPLES AND COMPARATIVE EXPERIMENT

A lemon-lime flavoured beverage emulsion was prepared using the following ingredients and formulation as shown in Table 1.

TABLE 1

| Ingredients | Phase | Ex. 1 | Ex. 2 | Ex. 3 |
|---|---|---|---|---|
| | | | % w/w | |
| Treated water | AQUEOUS | 82.03 | 87.03 | 92.03 |
| nOSA starch (C*Emcap12633) | PHASE | 15.0 | 10.0 | 5.0 |
| Potassium sorbate | | | 0.100 | |
| Citric acid | | | 0.35 | |
| Lemon oil 1x | OIL PHASE | | 1.625 | |
| Lime oil 1x | | | 0.875 | |
| Antioxidant | | | 0.020 | |

Specific gravity 1.00684
Acidity 0.300% w/w
Starch:oil ratio 6:1 (Ex.1); 4:1 (Ex. 2); 2:1 (Ex. 3)

The ingredients were mixed together in the order in which they appear in Table 1 to form a pre-emulsion, and were then subsequently homogenized at 300 bar for 1 pass with a double valve high pressure homogenizer (Niro Soavi) to reduce the droplet size and form the beverage emulsion.

The lemon-lime beverage emulsions were combined with further ingredients in the quantities and order indicated in Table 2 to produce a 5-throw syrup, which was then further diluted into a turbid carbonated beverage.

TABLE 2

| Ingredients | % w/w |
|---|---|
| Sugar | 9.230 |
| Potassium sorbate | 0.015 |
| Citric acid | 0.240 |
| Tri sodium citrate | 0.020 |
| Lemon-lime emulsion of example 1 | 0.100 |
| Carbonated (8 gl-1) water | 90.395 |

The turbid carbonated beverages were stored at four temperatures, 5° C., 25° C., 35° C. and 45° C. and their turbidity development was compared with a turbid beverage quarantined at room temperature. The results of Example 3 stored at 35° C. and 45° C. are presented in FIGURE (NTU vs. time), all experiments showing the same trend.

The NTU development in time for beverages manufactured in accordance with the invention was compared with a beverage made in accordance with Example 3 but stored at room temperature (COMPARATIVE EXPERIMENT).

FIGURE clearly shows that the heated finished beverages (◊—heated at 45° C.; and □—heated at 35° C.) become clear, i.e. their NTU reaches a value of below 5 in less than 24 h, whereas for a finished beverage (●) kept at room temperature, its NTU reaches a value of less than 5 in a much longer time.

The complete results on the turbidity (NTU) development with time characteristic to the various examples are shown in Table 3.

Flavoured beverage emulsions were prepared using various essential citrus oils, C*Emcap12633 and C*EmulTru 12674 nOSA starches and formulations as shown in Table 4.

TABLE 4

| Ingredients | Phase | Lemon | Orange | Grapefruit |
|---|---|---|---|---|
| | | | % w/w | |
| Treated water | AQUEOUS | 84.53 | 83.03 | 81.51 |
| nOSA starch | PHASE | 12.5 | 12.5 | 12.5 |
| Potassium sorbate | | | 0.100 | |
| Citric acid | | | 0.35 | |
| Lemon oil 1x | OIL PHASE | 1.625 | | |
| Lime oil 1x | | 0.875 | | |
| Orange 1x | | | 2.00 | |
| Orange 5x | | | 2.00 | |
| Grapefruit 1x | | | | 4.25 |
| Grapefruit 5x | | | | 1.27 |
| Antioxidant | | | 0.020 | |

Specific gravity: 1.00684
Acidity: 0.300% w/w
Starch:oil ratio: 5:1 (Lemon); 3.125:1 (Orange); 2.26:1 (Grapefruit)

The beverage emulsions of Table 4 were combined with further ingredients in the quantities and order indicated in Table 5 to produce a 5-throw syrup, which was then further diluted into a turbid carbonated beverage.

TABLE 5

| Ingredients | Lemon | Orange % w/w | Grapefruit |
|---|---|---|---|
| Sugar | 9.230 | 9.230 | 9.230 |
| Potassium sorbate | 0.015 | 0.015 | 0.015 |
| Citric acid | 0.240 | 0.240 | 0.240 |
| Tri sodium citrate | 0.020 | 0.020 | 0.020 |
| Lemon-lime emulsion of example | 0.100 | | |
| Orange emulsion of example | | 0.100 | |
| Grapefruit emulsion of example | | | 0.050 |
| Carbonated (8 gl-1) water | 90.395 | 90.395 | 90.445 |

The turbid beverages of Table 5 were stored at 45° C. and their turbidity development was compared with a turbid beverage quarantined at room temperature. The results are presented in Table 6.

TABLE 6

| Oil | Storage hours | NTU C*Emcap12633 | NTU C*EmulTru12674 |
|---|---|---|---|
| grapefruit | 0 | 34.3 | 29.6 |
| | 2 | 22.2 | 20.1 |
| | 4.5 | 13.7 | 13.8 |
| | 20.5 | 5.8 | 4.03 |
| | 24.5 | 4.39 | 3.5 |
| orange | 0 | 52.8 | 44 |
| | 2 | 34.4 | 31.3 |
| | 4.5 | 27.4 | 25.1 |
| | 20.5 | 8.08 | 7.85 |
| | 24.5 | 6.29 | 5.39 |
| lemon | 0 | 22 | 21.7 |
| | 2 | 13.6 | 13.4 |
| | 4.5 | 9.57 | 8.96 |
| | 20.5 | 2.08 | 2.35 |
| | 24.5 | 1.85 | 2.05 |

TABLE 3

| Storage time (hrs) | NTU development for various storage temperatures and starch concentrations ||||||||||||
| | Example 3 (5% nOSA) |||| Example 2 (10% nOSA) |||| Example 1 (15% nOSA) ||||
| | 5° C. | 25° C. | 35° C. | 45° C. | 5° C. | 25° C. | 35° C. | 45° C. | 5° C. | 25° C. | 35° C. | 45° C. |
|---|---|---|---|---|---|---|---|---|---|---|---|---|
| 0 | | | 15.00 | | | | 15.60 | | | | 15.20 | |
| 2 | | | 8.83 | 7.53 | | | 13.00 | 11.60 | | | 12.80 | 12.10 |
| 4 | | | 6.50 | 5.32 | | | 10.30 | 5.40 | | | 10.80 | 10.90 |
| 6 | | | 5.94 | 4.47 | | | 11.30 | 8.93 | | | 12.10 | 8.87 |
| 8 | | | 5.33 | 4.46 | | | 11.20 | 5.78 | | | 10.10 | 7.42 |
| 24 | 12.90 | 9.76 | 3.84 | 1.68 | 15.05 | 10.55 | 6.09 | 2.40 | 14.75 | 12.40 | 3.33 | 2.85 |
| 26 | | | 2.72 | 1.51 | | | 4.90 | 2.18 | | | 2.61 | 2.74 |
| 28 | | | 2.28 | 1.44 | | | 5.97 | 2.60 | | | 4.75 | 2.65 |
| 52 | | | 1.52 | 1.16 | | | 2.23 | 1.69 | | | 2.84 | 1.87 |

The invention claimed is:

1. A method for producing a clear beverage comprising:
providing an oil-in-water (O/W) emulsion comprising an n-alkenyl succinate starch and an essential oil, wherein the n-alkenyl succinate starch is in excess of said essential oil;
producing a turbid beverage by diluting said O/W emulsion to reach a desired beverage concentration; and
storing said turbid beverage at a temperature in a range of from 30° C. to 45° C. for a time in a range of 2 hours to 48 hours to obtain a clear beverage.

2. The method of claim 1, wherein the n-alkenyl succinate starch is a n-octenyl succinic anhydride (nOSA) starch.

3. The method of claim 1, wherein the O/W emulsion has a concentration of the essential oil concentration of between 0.75 wt % to and 40 wt %.

4. The method of claim 1, wherein the clear beverage has an essential oil concentration of between 0.001 wt % to below 0.70 wt %.

5. The method of claim 1, wherein the essential oil comprises an oil chosen from the group consisting of oils extracted from plants of the Rutaceae family, the Apiaceae family, the Myrtaceae family, the Lauraceae family and any combination of two or more of these families.

6. The method of claim 1, wherein the essential oil is extracted from citrus fruits.

7. The method of claim 1, further comprising preparing the O/W emulsion prior to diluting comprising the steps of:
a) preparing a pre-emulsion having an oil phase and an aqueous phase, the oil phase comprising the essential oil, the pre-emulsion further comprising the n-alkenyl succinate starch and wherein said n-alkenyl succinate starch is in an excess amount compared to the amount of essential oil; and
b) homogenizing the pre-emulsion to obtain said O/W emulsion.

8. The method of claim 7, wherein the homogenization is carried out with a homogenization pressure of between 100 bar and 1500 bar and wherein said homogenization is carried out in at least two passes.

9. The method of claim 1, wherein the O/W emulsion is in the form of a powder.

10. The method of claim 1, wherein a ratio of the n-alkenyl succinate starch to the essential oil in the O/W emulsion prior to diluting is between 1.2:1 and 8:1 (wt. %).

11. The method of claim 1, wherein the turbid beverage has a turbidity of between 10 and 50 NTU.

12. The method of claim 1, wherein the clear beverage has a turbidity of less than 7.5 NTU.

13. The method of claim 1, wherein the turbid beverage is stored for a storing time of 8 hours to 36 hours.

14. The method of claim 1, wherein the turbid beverage is stored at a temperature in a range of 35° C. to 45° C.

15. The method of claim 1, which is free of a deterpenation step.

16. The method of claim 8, wherein the homogenization is carried out with a homogenization pressure of between 100 bar and 1500 bar and wherein said homogenization is carried out in at least three passes.

17. The method of claim 7, wherein the homogenization is carried out with a homogenization pressure of between 100 bar and 500 bar and wherein said homogenization is carried out in at least three passes.

18. The method of claim 8, wherein the homogenization is carried out with a B homogenization pressure of about 300 bar and wherein said homogenization is carried out in at least three passes.

19. The method of claim 10, wherein the n-alkenyl succinate starch comprises n-octenyl succinic anhydride starch.

20. The method of claim 1, where storing is conducted under substantially isothermal conditions.

* * * * *